United States Patent
Burkard et al.

(10) Patent No.: US 9,809,199 B2
(45) Date of Patent: Nov. 7, 2017

(54) WIPER ARM DEVICE

(71) Applicant: Robert Bosch GmbH, Stuttgart (DE)

(72) Inventors: Hermann Burkard, Iffezheim (DE); Michael Kruse, Sinzheim (DE); Harald Rapp, Buehl (DE); Alexander Goeller, Baiersbronn (DE); Zsofia Horvath, Balatonfüzfo (HU)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 14/668,026

(22) Filed: Mar. 25, 2015

(65) Prior Publication Data
US 2015/0274127 A1 Oct. 1, 2015

(30) Foreign Application Priority Data
Mar. 25, 2014 (DE) .................. 10 2014 205 538

(51) Int. Cl.
*B60S 1/52* (2006.01)
*B60S 1/34* (2006.01)
*B60S 1/40* (2006.01)

(52) U.S. Cl.
CPC ............. *B60S 1/3415* (2013.01); *B60S 1/522* (2013.01); *B60S 2001/4054* (2013.01)

(58) Field of Classification Search
CPC .. B60S 1/52; B60S 1/522; B60S 1/524; B60S 1/3429; B60S 1/3415
USPC .......................... 15/250.04, 250.02, 250.351
See application file for complete search history.

(56) References Cited

U.S. PATENT DOCUMENTS

| 3,428,992 A * | 2/1969 | Di Giorgio | B60S 1/522 15/250.04 |
| 3,432,876 A * | 3/1969 | Edwards | B60S 1/522 15/250.04 |
| 5,074,471 A * | 12/1991 | Baumgarten | B60S 1/522 239/284.1 |
| 6,094,772 A * | 8/2000 | West | B60S 1/3415 15/250.04 |
| 6,286,174 B1 * | 9/2001 | Zimmer | B60S 1/522 15/250.04 |
| 6,934,992 B2 * | 8/2005 | Sato | B60S 1/522 15/250.04 |
| 2007/0079463 A1 * | 4/2007 | Vandine | B60S 1/32 15/250.351 |
| 2013/0036569 A1 * | 2/2013 | Caillot | B60S 1/32 15/250.04 |

FOREIGN PATENT DOCUMENTS

| DE | 102004007351 A1 * | 9/2005 |
| DE | 102012104064 A1 * | 11/2012 |
| EP | 0330458 * | 8/1989 |

(Continued)

*Primary Examiner* — Gary Graham
(74) *Attorney, Agent, or Firm* — Michael Best & Friedrich LLP

(57) ABSTRACT

A wiper arm device comprising a wiper arm unit which has at least one wiper rod, and comprising at least one nozzle unit which is provided for applying washer fluid onto a vehicle window, and which, in an installed state, is arranged at least substantially laterally on the wiper arm unit. The nozzle unit, in the installed state, is arranged at least substantially as an extension of a wiper rod of the wiper arm unit and is fastened to the wiper arm unit by a latching connection.

18 Claims, 9 Drawing Sheets

(56) References Cited

FOREIGN PATENT DOCUMENTS

| EP | 1985513 | | 10/2008 |
|---|---|---|---|
| FR | 2752800 | * | 3/1998 |
| FR | 2902063 | * | 12/2007 |
| JP | 2002-370625 | * | 12/2002 |

* cited by examiner

WIPER ARM DEVICE

BACKGROUND OF THE INVENTION

EP 1 985 513 A1 discloses a wiper arm device comprising a wiper arm unit which has a wiper rod, and comprising a nozzle unit which is provided for applying washer fluid onto a vehicle window. In at least one refinement, the nozzle unit here, in an installed state, is arranged substantially laterally on the wiper arm unit.

SUMMARY OF THE INVENTION

The invention is based on a wiper arm device comprising a wiper arm unit which has at least one wiper rod, and comprising at least one nozzle unit which is provided for applying washer fluid onto a vehicle window, and which, in an installed state, is arranged at least substantially laterally on the wiper arm unit.

It is proposed that the at least one nozzle unit, in an installed state, is arranged at least substantially as an extension of a wiper rod of the wiper arm unit and is fastened to the wiper arm unit by means of a latching connection. In an installed state, the at least one nozzle unit is preferably arranged at least substantially laterally on a wiper arm adapter of the wiper arm unit.

A "wiper arm unit" is intended to be understood as meaning, in particular, a unit which has a wiper rod and/or a wiper arm adapter and/or a drive shaft connection and which can preferably be designed as a wiper rod and/or as a wiper arm adapter. In this context, a "wiper arm adapter" is intended to be understood as meaning, in particular, an adapter which has a contact region with a wiper rod and which is provided in order to provide a coupling region of the wiper rod for coupling to and/or making contact with a wiper blade, in particular a wiper blade adapter of the wiper blade. The wiper arm adapter of the wiper arm unit is preferably formed in particular by a top-lock wiper arm adapter. In this context, a "drive shaft connection" is intended to be understood as meaning, in particular, a connecting part of the wiper arm, which connecting part is provided in order to be connected to a drive shaft driven by a motor and in order to be pivoted about a center of rotation in a wiping operation. A "nozzle unit" is intended to be understood as meaning, in particular, a unit which comprises at least one nozzle element for applying the washer fluid onto the vehicle window. In this context, a "nozzle element" is intended to be understood as meaning, in particular, an element which is provided for discharging washer fluid and for spraying same preferably in a certain direction. In particular, the nozzle element has at least one nozzle opening which opens a washer fluid system towards a surrounding area. The nozzle element can be produced in particular from a metal and/or particularly advantageously from a plastic. In particular, the at least one nozzle unit is directly connected to the wiper arm unit. In this context, "directly connected" is intended to be understood as meaning, in particular, connected in direct contact with one another. "Provided" is intended here and below to be understood as meaning, in particular, specially designed and/or equipped. The fact that an object is provided for a certain function is intended to be understood as meaning, in particular, that the object carries out and/or executes this certain function in at least one use and/or operating state. In this context, "washer fluid" is intended to be understood as meaning, in particular, a liquid suitable for washing and/or cleaning a vehicle window, such as, in particular, water, alcohols or mixtures which have a water portion, an antifreeze portion and/or an alcohol portion. The fact that the at least one nozzle unit, in an installed state, is arranged "at least substantially laterally" on the wiper arm unit is intended to be understood as meaning, in particular, that the at least one nozzle unit, in an installed state, is arranged substantially next to the wiper arm unit, as viewed from a direction perpendicular to the vehicle window. That is to say, in particular, that, in a two-dimensional view, as viewed from the direction perpendicular to the vehicle window, a region of overlap between the at least one nozzle unit and the wiper arm unit is less than 30%, preferably less than 20% and particularly preferably less than 10% of a visible surface of the nozzle unit and/or of the wiper arm unit. This is preferably intended to be understood as meaning, in particular, that at least 20%, preferably at least 40% and particularly preferably at least 60% of all of the planes which extend parallel to the vehicle window in the region of the at least one nozzle unit and intersect the nozzle unit also intersect the wiper arm unit. This is preferably intended to be understood as meaning, in particular, that a smallest angle between a plane, which extends parallel to the vehicle window in the region of the at least one nozzle unit, and an imaginary straight line, which intersects a geometrical center point of the nozzle unit and a geometrical center point of the wiper arm unit, is at least less than 50°, preferably less than 40° and particularly preferably less than 30°. The fact that the at least one nozzle unit, in an installed state, is arranged "at least substantially as an extension" of a wiper rod of the wiper arm unit is intended to be understood as meaning, in particular, that an imaginary straight line, which extends parallel to a main direction of extent of the wiper rod of the wiper arm unit and intersects a geometrical center point of the wiper rod, intersects the nozzle unit in an installed state of the nozzle unit. This is preferably intended to be understood as meaning, in particular, that, in an installed state of the nozzle unit, a main direction of extent of the nozzle unit extends at least approximately parallel to the main direction of extent of the wiper rod of the wiper arm unit. A "main direction of extent" of a constructional unit and/or of a component is intended to be understood as meaning, in particular, a direction which extends parallel to a largest side edge of a smallest geometrical cuboid which just still completely surrounds the constructional unit and/or the component. Furthermore, "at least approximately parallel" is intended here to be understood as meaning, in particular, that an angular deviation in relation to parallel is at maximum 20°, preferably at maximum 15° and particularly preferably at maximum 10°. In this context, a "latching connection" is intended to be understood as meaning, in particular, a connection between at least two latching units. This is preferably intended to be understood as meaning, in particular, a connection in which at least one latching means of a first latching unit engages in a latching recess of a second latching unit. In this context, a "latching means" is intended here to be understood as meaning, in particular, a spring-elastic element for producing a latching connection, which element is provided in order to be elastically deflected during installation.

By means of an appropriate configuration of the wiper arm device, in particular an advantageous nozzle unit can be provided. By means of the arrangement, preferably in particular an advantageous distribution of the washer liquid can be achieved. Furthermore, in particular an advantageously reliable connection of the nozzle unit to the wiper arm unit can thereby be achieved. In addition, an advantageously aerodynamic arrangement of the nozzle unit can in particular thereby be achieved.

Furthermore, it is proposed that the at least one nozzle unit, in the installed state, is arranged at least substantially, and preferably completely, outside a side flank of the wiper arm unit. In this context, a "side flank" is intended to be understood as meaning, in particular, a side wall or a skirt of the wiper arm unit that is angled from a top side of the wiper arm at least substantially orthogonally, i.e. in particular is angled in relation to the top side of the wiper arm by an angle of at least 75°, preferably of at least 80° and particularly preferably of at least 85°. In particular, two opposite side flanks and the top side of the wiper arm unit form a substantially U-shaped profile. The fact that the at least one nozzle unit, in the installed state, is arranged "at least substantially outside" a side flank of the wiper arm unit is intended to be understood as meaning, in particular, that, starting from a geometrical center point of the wiper arm unit, the at least one nozzle unit is arranged at least substantially behind a side flank of the wiper arm unit. This is preferably intended to be understood as meaning, in particular, that the nozzle unit is arranged at least substantially on a side of the corresponding side flank, which side faces away from the side flank opposite the corresponding side flank. In particular, this is intended to be understood as meaning that at least 50%, preferably at least 70% and particularly preferably at least 90% of the at least one nozzle unit, in an installed state, is arranged outside the side flank of the wiper arm unit. By this means, in particular, an advantageous, simple installation of the at least one nozzle unit can be achieved. Furthermore, in particular an advantageous arrangement of the nozzle unit on the wiper arm unit can thereby be achieved.

The at least one nozzle unit is advantageously installable on the wiper arm unit at least by means of a movement directed in a wiping direction. In this context, a "wiping direction" is intended to be understood as meaning, in particular, a direction in which, in an operating state, the wiper arm unit is guided over the vehicle window to be wiped. This is preferably intended to be understood as meaning, in particular, a direction in which, in an operating state, the wiper arm unit guides a wiper blade over the vehicle window to be wiped. The wiping direction preferably extends in particular approximately perpendicularly to a main direction of extent of the wiper rod. Particularly preferably, the wiping direction defines in particular both a direction of movement of the wiper arm unit during an upwards movement and during a downwards movement. The fact that the at least one nozzle unit is "installable on the wiper arm unit at least by means of a movement directed in a wiping direction" is intended to be understood as meaning, in particular, that the nozzle unit, for installation on the wiper arm unit, has to be moved at least partially at least approximately parallel to the wiping direction. This is preferably intended to be understood as meaning, in particular, that the nozzle unit, when installed on the wiper arm unit, has to be moved in the direction of the wiper arm unit at least approximately parallel to the wiping direction at least in order to produce the latching connection. As a result, in particular, secure installation of the nozzle unit on the wiper arm unit can be achieved. In particular, an unintentional removal of the nozzle unit can thereby be preferably prevented. Furthermore, in particular, particularly simple and convenient installation can thereby be achieved.

In a preferred refinement of the invention, it is proposed that the wiper arm unit has at least one at least substantially rigid first holding element on which the at least one nozzle unit is fixed in the installed state. An "at least substantially rigid" element is intended to be understood as meaning, in particular, an element which is movement-free at least substantially relative to itself over an entire extent. This is preferably intended to be understood as meaning, in particular, an element which is movement-free under a designated loading during operation. This is preferably intended to be understood as meaning, in particular, an element which has an elastic deformation of less than 2 mm, preferably of less than 1 mm and particularly preferably of less than 0.5 mm during conventional operation under a loading of at least 1 N, preferably of at least 5 N and particularly preferably of at least 10 N over an entire extent. This is particularly preferably intended to be understood as meaning, in particular, an element which, in the event of action of a resting bending stress, has a limit stress of at least 100 N/mm$^2$, preferably of at least 200 N/mm$^2$ and particularly preferably of at least 300 N/mm$^2$. By this means, particularly reliable securing of the nozzle unit on the wiper arm unit can advantageously be achieved. Furthermore, in particular, an advantageously robust holding element can thereby be provided.

Furthermore, it is proposed that the at least one first holding element is arranged on an end side of the wiper arm unit. In this context, an "end side" of the wiper arm unit is intended to be understood as meaning, in particular, a free end of the wiper arm unit, which end faces away from the drive shaft connection and/or a center of rotation of the wiper arm unit. This is preferably intended to be understood as meaning, in particular, a free end of the wiper arm adapter. If the at least one holding element is arranged on an end side of the wiper arm unit, in particular an advantageous arrangement of the at least one first holding element can be achieved. Furthermore, in particular, a secure support of the nozzle unit on the wiper arm unit can thus be achieved.

Furthermore, it is proposed that the at least one first holding element is formed by a first tab pointing in a wiping direction. In this context, a "tab" is intended to be understood as meaning, in particular, a projection-like element. This is preferably intended to be understood as meaning, in particular, an element which at least partially protrudes from a basic shape of the wiper arm unit. This is particularly preferably intended to be understood as meaning, in particular, an element with an approximately rectangular basic shape which protrudes at least approximately perpendicularly from a basic shape of the wiper arm unit. As a result, in particular, a particularly advantageous holding element can be provided. In particular, an advantageously simple fastening of the nozzle unit can thereby in particular be achieved.

The at least one first holding unit advantageously has at least one barb for securing the at least one nozzle unit. In this context, a "barb" is intended to be understood as meaning, in particular, an element and/or a part of an element that is provided for preventing removal of the nozzle unit from the holding element. This is preferably intended to be understood as meaning, in particular, an element and/or a part of an element that is provided for blocking a movement of the nozzle unit, in an installed state, counter to an installation direction. This is preferably intended to be understood as meaning, in particular, an element and/or a part of an element that, as viewed from an installation direction of the nozzle unit, at least partially forms an undercut region. The element and/or the part of the element in the undercut region particularly preferably has a stop surface which is angled in relation to an installation direction by at least 70°, preferably by at least 80° and particularly preferably by at least 90°. As a result, in particular, reliable support of the nozzle unit on the wiper arm unit can be ensured. In addition, inadvertent release of the nozzle unit can thereby be reliably prevented. In particular, a destruction-free release of the nozzle unit from the wiper arm unit can thus be prevented.

In a particularly preferred refinement of the invention, it is proposed that the wiper arm unit has at least one at least substantially rigid second holding element on which the at least one nozzle unit is fixed in the installed state. As a result, in particular, reliable support of the nozzle unit can be achieved. In particular, an advantageously reliable positioning of the nozzle unit during installation can thus be achieved.

If the at least one second holding element is arranged spaced apart from an end side of the wiper arm unit, in particular reliable support of the nozzle unit can be achieved. Particularly preferably, an advantageously reliable positioning of the nozzle unit can thus be achieved. The at least one second holding element is preferably arranged spaced apart from an end side of the wiper arm unit by at least 0.5 cm, preferably at least 1 cm and particularly preferably at least 3 cm. Particularly preferably, the at least one second holding element is arranged spaced apart from the end side of the wiper arm unit in the direction of a drive shaft connection and/or a center of rotation of the wiper arm unit.

Furthermore, it is proposed that the at least one second holding element is formed by a second tab pointing in a wiping direction. The at least one second holding element preferably protrudes in a wiping direction from a basic shape of the wiper arm unit. As a result, in particular, particularly advantageous holding elements can be provided. Furthermore, in particular, particularly reliable support of the nozzle unit can thereby be achieved.

In one refinement of the invention, it is proposed that the at least one second holding element has at least one barb for securing the at least one nozzle unit. As a result, in particular, particularly reliable support of the nozzle unit on the wiper arm unit can be ensured. In addition, inadvertent release of the nozzle unit can thereby be reliably prevented. In particular, a destruction-free release of the nozzle unit from the wiper arm unit can thus be prevented.

In a further refinement of the invention, it is proposed that the at least one second holding element has at least one fastening recess for receiving at least one fastening element for securing the at least one nozzle unit. In this context, a "fastening recess" is intended to be understood as meaning, in particular, a depression or a continuous recess which is provided for at least partially receiving a fastening element for fastening purposes. This is preferably intended to be understood as meaning, in particular, a depression or a continuous recess which is provided for securing a fastening element for fastening purposes. Particularly preferably, the fastening recess is formed in particular by a continuous recess which is provided to be reached through by a fastening element, in particular completely, for securing the nozzle element on the second holding element. In this context, a "fastening element" is intended to be understood as meaning, in particular, an element which is provided for interacting with a corresponding fastening element in order to produce a connection and/or for engaging in a fastening recess in order to produce a connection. This is preferably intended to be understood as meaning, in particular, an element which is provided for producing a form-fitting and/or frictional connection with a corresponding fastening element and/or a corresponding fastening recess. Various fastening elements appearing expedient to a person skilled in the art are conceivable, such as, for example, screws, rivets and/or, particularly preferably, latching projections. By this means, in particular, particularly reliable support of the nozzle unit on the wiper arm unit can be ensured. Furthermore, in particular, securing can thereby take place in a particularly simple and reliable manner.

Furthermore, it is proposed that a main plane of extent of the at least one first holding element and a main plane of extent of the at least one second holding element enclose an angle of at least substantially 90°. A "main plane of extent" of an object is intended to be understood as meaning, in particular, a plane which is parallel to a largest side surface of a smallest geometrical cuboid which precisely still completely surrounds the object, and, in particular, runs through the center point of the cuboid. As a result, in particular, particularly reliable securing can be achieved. In particular, a slight inadvertent release can preferably thereby be avoided.

Furthermore, it is proposed that the at least one nozzle unit has at least one first recess for receiving the at least one first holding element. The at least one recess is preferably formed in a manner corresponding to and preferably at least substantially in a precisely fitting manner with the at least one first holding element. As a result, in particular, an advantageously simple and rapid installation of the nozzle unit can be achieved. Furthermore, in particular, advantageous support of the nozzle unit on the at least one first holding element can thereby be achieved.

In one refinement of the invention, it is proposed that the at least one nozzle unit has at least one second recess for receiving the at least one second holding element. The at least one second recess is preferably formed in a manner corresponding to and preferably at least substantially in a precisely fitting manner with the at least one second holding element. As a result, in particular, an advantageously simple and rapid installation of the nozzle unit can be achieved. Furthermore, in particular, advantageous support of the nozzle unit on the at least one second holding element can thereby be achieved.

Furthermore, it is proposed that the at least one nozzle unit has at least one first spring element which, in the installed state, is latched to the at least one first holding element. In this context, a "spring element" is intended to be understood as meaning, in particular, a macroscopic element which has at least one extent which, in a normal operating state, is elastically changeable by at least 10%, in particular by at least 20%, preferably by at least 30% and particularly advantageously by at least 50%, and which, in particular, produces a counterforce which is dependent on a change in the extent and is preferably proportional to the change and which opposes the change. An "extent" of an element is intended to be understood as meaning, in particular, a length of an edge of a smallest geometrical cuboid which precisely still completely surrounds the object. A "macroscopic element" is intended to be understood as meaning, in particular, an element with an extent of at least 1 mm, in particular of at least 2 mm and preferably of at least 4 mm. By this means, in particular, secure support of the nozzle unit of the at least one first holding element can be achieved. The at least one first spring element is preferably arranged in the at least one first recess, as a result of which advantageous protection of the at least one first spring element can be achieved. Furthermore, the at least one nozzle unit can have at least one second spring element which can preferably be arranged in the at least one second recess.

In addition, it is proposed that the at least one nozzle unit has at least two first spring elements between which the at least one first holding element is latched in the installed state. By this means, in particular, particularly reliable support of the nozzle unit on the at least one first holding element can be achieved. Furthermore, an inadvertent release can be reliably avoided. The at least two first spring elements are preferably arranged in the at least one first recess, as a result of which advantageous protection of the first spring elements can be achieved.

In a further refinement of the invention, it is proposed that the at least one nozzle unit has a fastening element which, in particular, is integrally formed thereon and which, in the installed state, is arranged in the at least one fastening recess. In particular, the fastening element can be designed as a bolt and/or preferably as a latching element, in particular as a latching bolt. In this context, a "latching bolt" is intended to be understood as meaning, in particular, a bolt-shaped latching element. This is preferably intended to be understood as meaning, in particular, a latching element which has an at least approximately cylindrical basic shape. Particularly preferably, this is intended to be understood as meaning, in particular, a latching element which has an at least approximately cylindrical basic shape, wherein latching means are arranged on an outer surface, in particular on a lateral surface of the basic shape. By this means, in particular, secure and reliable support of the nozzle unit on the at least one fastening recess can be achieved. Furthermore, an inadvertent release can be reliably avoided.

Advantageously, the at least one nozzle unit, in the installed state, is arranged in a wiper arm adapter region of the wiper arm unit. In this context, a "wiper arm adapter region" is intended to be understood as meaning, in particular, a region around a wiper arm adapter. The wiper arm adapter region preferably extends around the end side of the wiper arm unit. In particular, the wiper arm adapter region extends within a region at a distance from the wiper arm adapter and/or from the end side of the wiper arm unit of less than 20 cm, in particular of less than 15 cm, preferably of less than 10 cm and particularly preferably of less than 5 cm. In particular, an advantageous arrangement of the nozzle unit can thereby be achieved. In particular, an advantageous distribution of washer liquid can preferably be achieved by the arrangement.

Furthermore, it is proposed that the at least one nozzle unit, in the installed state, is arranged on a wiper arm adapter of the wiper arm unit. The wiper arm adapter is preferably designed as a side-lock wiper arm adapter and, particularly advantageously, as a top-lock wiper arm adapter. In particular, a particularly advantageous arrangement of the nozzle unit can thereby be achieved. In particular, an advantageous distribution of washer liquid can preferably be achieved by the arrangement.

The wiper arm device according to the invention is not intended to be restricted here to the above-described use and embodiment. In particular, the wiper arm device according to the invention can have a number of individual elements, components or units differing from a number mentioned herein in order to carry out an operation described herein.

BRIEF DESCRIPTION OF THE DRAWINGS

Further advantages emerge from the description below of the drawing. The drawing illustrates exemplary embodiments of the invention. The drawing, the description and the claims contain numerous features in combination. A person skilled in the art will expediently also consider the features individually and put them together to form meaningful further combinations.

In the drawings.

DETAILED DESCRIPTION

Figure 1:
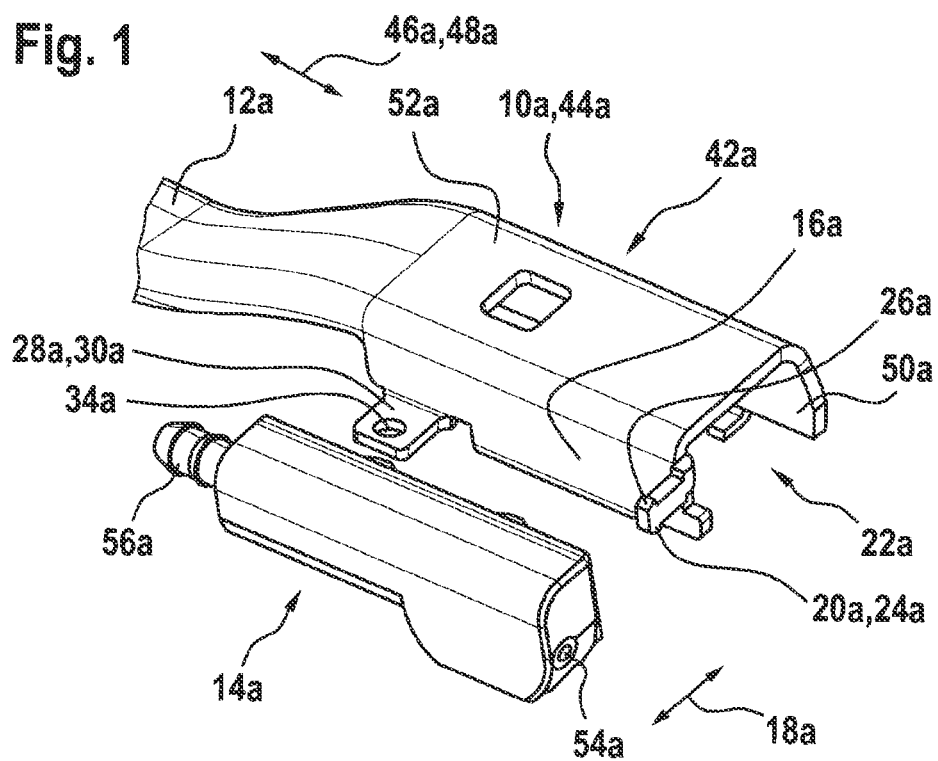
FIG. 1 shows a wiper arm device comprising a nozzle unit and comprising a wiper arm unit, which has a wiper rod and a wiper arm adapter, in a schematic exploded illustration.
Figure 2:
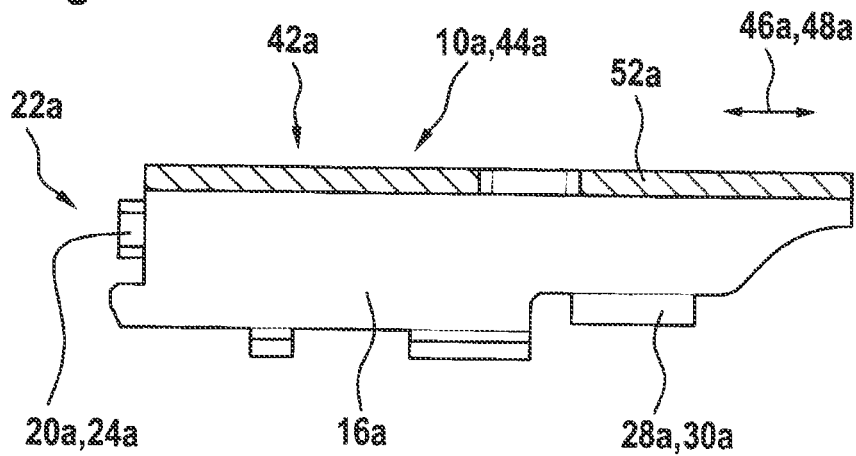
FIG. 2 shows the wiper arm unit of the wiper arm device in a schematic sectional illustration parallel to a main direction of extent of the wiper arm unit.
Figure 3:
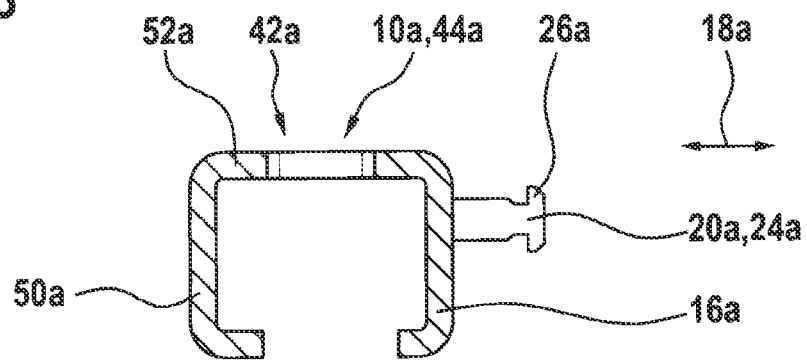
FIG. 3 shows the wiper arm unit of the wiper arm device in a schematic sectional illustration perpendicular to the main direction of extent of the wiper arm unit.

FIG. 1 shows a wiper arm device comprising a wiper arm unit 10a and comprising a nozzle unit 14a. The wiper arm device is illustrated in partially exploded form in FIG. 1 and during installation. The wiper arm device forms part of a wiper arm. The wiper arm unit 10a has a wiper rod 12a. Furthermore, the wiper arm unit 10a has a wiper arm adapter 44a. The wiper arm adapter 44a is formed by a top-lock wiper arm adapter. The wiper arm adapter 44a is provided for receiving a wiper blade adapter of a wiper blade (not visible further) during an operation. For this purpose, a wiper blade adapter is accommodated in the wiper arm adapter 44a. Furthermore, the wiper arm adapter 44a is formed integrally with the wiper rod 12a of the wiper arm unit 10a. The wiper rod 12a has a main direction of extent 46a which approximately corresponds to a main direction of extent 48a of the wiper arm adapter 44a. The wiper arm adapter 44a has a length of between 4 cm and 6 cm, as viewed parallel to the main direction of extent 48a thereof. The wiper arm adapter 44a has a length of approximately 5 cm, as viewed parallel to the main direction of extent 48a thereof. The wiper arm adapter 44a has an approximately U-shaped cross section, as viewed in a plane perpendicularly to the main direction of extent 48a. The two sides of the U-shaped cross section are respectively formed here by side flanks 16a, 50a of the wiper arm unit 10a. The two sides of the U-shaped cross section are respectively formed by side flanks 16a, 50a of the wiper arm adapter 44a. The side flanks 16a, 50a have a height of between 1 cm and 2 cm, as viewed perpendicularly to the main direction of extent 48a of the wiper arm adapter 44a. The side flanks 16a, 50a have a height of approximately 1.2 cm, as viewed perpendicularly to the main direction of extent 48a of the wiper arm adapter 44a. Furthermore, the side flanks 16a, 50a are spaced apart from each other by between 1 cm and 2 cm, as viewed perpendicularly to the main direction of extent 48a of the wiper arm adapter 44a and perpendicularly to a main plane of extent of the side flanks 16a, 50a. The side flanks 16a, 50a are spaced apart from each other by approximately 1.6 cm, as viewed perpendicularly to the main direction of extent 48a of the wiper arm adapter 44a and perpendicularly to a main plane of extent of the side flanks 16a, 50a. In principle, however, a different dimensioning of the wiper arm adapter 44a appearing expedient to a person skilled in the art would also be conceivable. The side flanks 16a, 50a are connected via a main side 52a of the wiper arm adapter 44a. The main side 52a forms an upper side of the wiper arm adapter 44a. The side flanks 16a, 50a in each case merge into the main side 52a via a radius. The radius is between 0.1 cm and 0.5 cm. The radius is approximately 0.3 cm. In principle, however, a different radius appearing expedient to a person skilled in the art would also be conceivable. Guide rails which are provided for guiding and securing a wiper blade adapter in the wiper arm adapter 44a are respectively arranged on the free ends of the side flanks 16a, 50a of the wiper arm adapter 44a, which ends face away from the main side 52a. The guide rails are formed integrally with the side flanks 16a, 50a. The side flanks 16a, 50a in each case merge into the guide rails via a radius. The radius is between 0.1 cm and 0.3 cm. The radius is approximately 0.2 cm. In principle, however, a different radius appearing expedient to a person skilled in the art would also be conceivable. The wiper arm adapter 44a is formed integrally and is bent from a metal plate. In principle, however, a multi-part design and/or a different starting material appearing expedient to a person skilled in the art would also be conceivable (FIGS. 2, 3).

Furthermore, the wiper arm unit 10a has a substantially rigid first holding element 20a. The nozzle unit 14a, in the installed state, is secured on the first holding element 20a. The first holding element 20a is arranged on an end side 22a of the wiper arm unit 10a. The first holding element 20a is arranged on an end side 22a of the wiper arm adapter 44a. The first holding element 20a forms part of the end side 22a of the wiper arm unit 10a. The first holding element 20a is formed by a first tab 24a pointing in a wiping direction 18a. The first holding element 20a has a length of between 0.5 cm and 1.5 cm, as viewed along the wiping direction 18a. The first holding element 20a has a length of approximately 1 cm, as viewed along the wiping direction 18a. In principle, however, a different length appearing expedient to a person skilled in the art would also be conceivable. The wiping direction 18a extends perpendicularly to the main direction of extent 48a of the wiper arm adapter 44a and perpendicularly to a main plane of extent of the side flank 16a. The first holding element 20a has a main plane of extent which extends perpendicularly to the main direction of extent 48a of the wiper arm adapter 44a and perpendicularly to a main plane of extent of the side flank 16a. Furthermore, a main plane of extent of the first holding element 20a extends parallel to an end side 22a of the wiper arm unit 10a. The first holding element 20a has two barbs 26a for securing the nozzle unit 14a. The barbs 26a are in each case formed by lugs which in each case protrude on opposite sides from a basic body of the first holding element 20a. The barbs 26a in each case protrude from the basic body of the first holding element 20a perpendicularly to the main direction of extent 48a of the wiper arm adapter 44a and parallel to a main plane of extent of the side flank 16a. The basic body of the first holding element 20a has a constricted partial region directly behind the barbs 26a. Secure latching can be made possible by means of the constricted partial region. In principle, however, it would also be conceivable for the basic body of the first holding element 20a to have a constant cross section. The first holding element 20a is directly adjacent to the side flank 16a of the wiper arm unit 10a. The first holding element 20a protrudes from the wiper arm adapter 44a perpendicularly to the side flank 16a. Furthermore, the first holding element 20a is formed integrally with the wiper arm adapter 44a. The first holding element 20a is bent together with the wiper arm adapter 44a from a metal plate. In principle, however, a different material appearing expedient to a person skilled in the art and/or a formation separate from the wiper arm adapter 44a would also be conceivable. In principle, it would also be conceivable for the first holding element 20a to be configured so as to be retrofittable retrospectively to a wiper arm adapter 44a (FIGS. 1, 2).

Furthermore, the wiper arm unit 10a has a substantially rigid second holding element 28a. The nozzle unit 14a, in the installed state, is secured on the second holding element 28a. The nozzle unit 14a, in the installed state, is secured on the first holding element 20a and the second holding element 28a. The second holding element 28a is arranged spaced apart from an end side 22a of the wiper arm unit 10a. The second holding element 28a is at a distance of between 3 cm and 5 cm from the end side 22a, as viewed parallel to the main direction of extent 48a of the wiper arm adapter 44a. The second holding element 28a is at a distance of approximately 3.5 cm from the end side 22a, as viewed parallel to the main direction of extent 48a of the wiper arm adapter 44a. The second holding element 28a is space apart by between 3 cm and 5 cm from the first holding element 20a, as viewed parallel to the main direction of extent 48a of the wiper arm adapter 44a. The second holding element 28a is spaced apart by approximately 3.5 cm from the first holding element 20a, as viewed parallel to the main direction of extent 48a of the wiper arm adapter 44a. In principle, however, a different distance appearing expedient to a person skilled in the art would also be conceivable. The second holding element 28a is arranged at a free end of the side flank 16a of the wiper arm adapter 44a, which end faces away from the main side 52a. The second holding element 28a is arranged on a side of the side flank 16a that faces away from the guide rails. The second holding element 28a is directly adjacent to the side flank 16a of the wiper arm unit 10a. The second holding element 28a protrudes from the wiper arm adapter 44a perpendicularly to the side flank 16a. The second holding element 28a is formed by a second tab 30a pointing in a wiping direction 18a. The second holding element 28a has a length of between 0.5 cm and 1.5 cm, as viewed along the wiping direction 18a. The second holding element 28a has a length of approximately 0.8 cm, as viewed along the wiping direction 18a. In principle, however, a different length appearing expedient to a person skilled in the art would also be conceivable. The second holding element 28a has a main plane of extent which extends parallel to the main direction of extent 48a of the wiper arm adapter 44a and perpendicularly to a main plane of extent of the side flank 16a. Furthermore, a main plane of extent of the first holding element 20a extends parallel to a main side 52a of the wiper arm adapter 44a. The second holding element 28a has a fastening recess 34a. The fastening recess 34a is provided for receiving a fastening element 35a for securing the at least one nozzle unit 14a. The fastening recess 34a is formed by a continuous recess. The fastening recess 34a is formed by a round passage bore. The fastening recess 34a has a diameter of between 0.2 cm and 0.6 cm. The fastening recess 34a has a diameter of approximately 0.4 cm. In principle, however, a different fastening recess appearing expedient to a person skilled in the art and/or a different diameter appearing expedient to a person skilled in the art would also be conceivable. The fastening recess 34a extends through a material of the second tab 30a perpendicularly to the main direction of extent 48a of the wiper arm adapter 44a and parallel to a main plane of extent of the side flank 16a. Furthermore, the first holding element 20a is formed integrally with the wiper arm adapter 44a. The first holding element 20a is bent together with the wiper arm adapter 44a from a metal plate. In principle, however, a different material appearing expedient to a person skilled in the art and/or a formation separate from the wiper arm adapter 44a would also be conceivable. In principle, it would also be conceivable for the first holding element 20a to be configured so as to be able to be retrofitted retrospectively to a wiper arm adapter 44a (FIGS. 1, 2).

The main plane of extent of the first holding element 20a and the main plane of extent of the second holding element 28a enclose an angle of essentially 90°. The main plane of extent of the first holding element 20a and the main plane of extent of the second holding element 28a enclose an angle of 90° (FIG. 2).

The wiper arm device has the nozzle unit 14a. The nozzle unit 14a is provided for applying washer fluid onto a vehicle window. In an operating state, the nozzle unit 14a is provided for applying washer fluid onto and for distributing same over a vehicle window, the washer fluid being supplied to the nozzle unit 14a via a washer fluid tube (not visible further). For this purpose, the nozzle unit 14a has a plurality of wiper nozzles 54a. In principle, however, it would also be conceivable for the nozzle unit 14a to have just one wiper nozzle 54a. In an installed state of the nozzle unit 14a, the wiper nozzles 54a each have spraying directions pointing in the direction of the vehicle window. Furthermore, the nozzle unit 14a has a connecting branch 56a for a washer fluid tube. The connecting branch 56a is arranged, as viewed along a main direction of extent of the nozzle unit 14a, at a rear end of the nozzle unit 14a, which end is spaced apart from the wiper nozzles 54a. In an installed state of the nozzle unit 14a, the connecting branch 56a is arranged on a side of the nozzle unit 14a, which side faces the wiper rod 12a of the wiper arm unit 10a. As a result, the washer fluid tube can advantageously be guided along the wiper rod 12a to the nozzle unit 14a (FIG. 1).

The nozzle unit 14a, in an installed state, is arranged substantially laterally on the wiper arm unit 10a. The nozzle unit 14a, in an installed state, is arranged in a wiper arm adapter region 42a of the wiper arm unit 10a. In an installed state, the nozzle unit 14a is arranged on the wiper arm adapter 44a of the wiper arm unit 10a. In an installed state, the nozzle unit 14a is arranged substantially laterally on the wiper arm adapter 44a of the wiper arm unit 10a. Furthermore, the nozzle unit 14a, in an installed state, is arranged substantially as an extension of the wiper rod 12a of the wiper arm unit 10a. The main direction of extent 46a of the wiper rod 12a runs approximately parallel to the main direction of extent of the nozzle unit 14a. An imaginary straight line which extends parallel to the main direction of extent 46a of the wiper rod 12a and intersects a geometrical center point of the wiper rod 12a intersects the nozzle unit 14a in an installed state. In an installed state, the nozzle unit 14a is arranged outside the side flank 16a of the wiper arm adapter 44a of the wiper arm unit 10a (FIG. 1).

Figure 4:
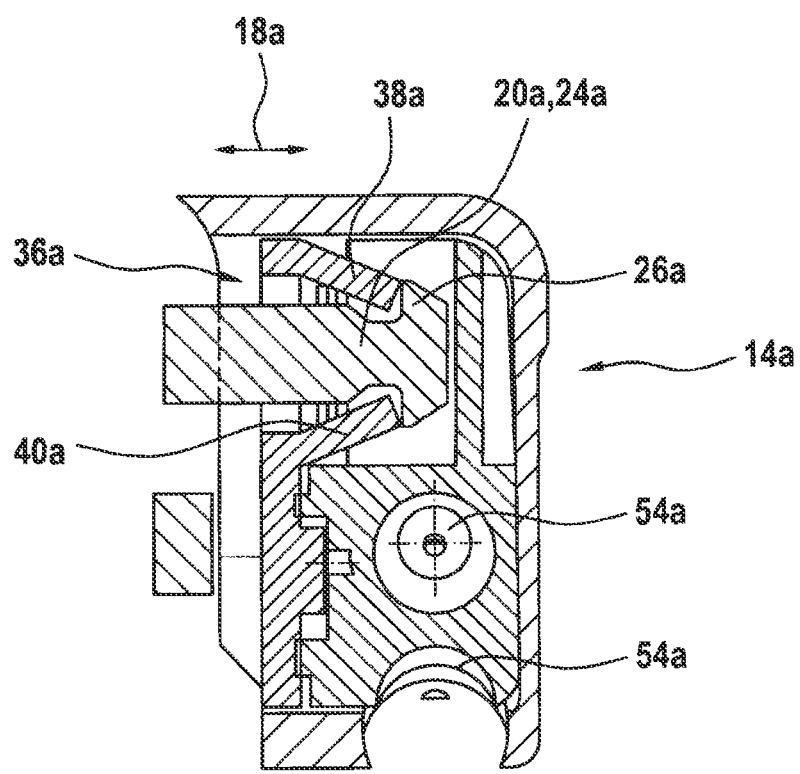
FIG. 4 shows a partial exert of the wiper arm device comprising the nozzle unit and the wiper arm unit in a schematic sectional illustration through a first holding element of the wiper arm unit.

Furthermore, the nozzle unit 14a, in an installed state, is fastened to the wiper arm unit 10a by means of a latching connection. The nozzle unit 14a has a first recess 36a for receiving the first holding element 20a of the wiper arm unit 10a. In an installed state of the nozzle unit 14a, the first holding element 20a is accommodated in the first recess 36a of the nozzle unit 14a. The nozzle unit 14a has two first spring elements 38a, 40a which, in the installed state, latch to the first holding element 20a. In an installed state of the nozzle unit 14a, the first holding element 20a latches between the two first spring elements 38a, 40a. The two first spring elements 38a, 40a are arranged in the recess 36a of the nozzle unit 14a. The two first spring elements 38a, 40a are in each case formed by spring-elastic webs protruding into the recess 36a. The two first spring elements 38a, 40a taper the recess 36a in a direction pointing into the recess 36a. The two first spring elements 38a, 40a converge towards each other approximately conically in a direction pointing into the recess 36a. The two first spring elements 38a, 40a are formed in a contact-free manner with respect to each other. Furthermore, a depth of the recess 36a is greater than a length of the two first spring elements 38a, 40a, and therefore, in an installed state of the nozzle unit 14a, the barbs 26a of the first holding element 20a can latch in the recess 36a behind the two first spring elements 38a, 40a. For this purpose, when the nozzle unit 14a is installed, the spring elements 38a, 40a are deflected outwards in a spring-elastic manner by means of the first holding element 20a and subsequently latch behind the barbs 26a of the first holding element 20a (FIGS. 1, 3, 4).

Figure 5:
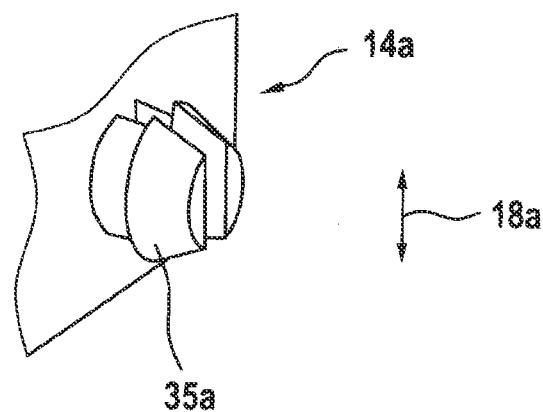
FIG. 5 shows a partial exert of the nozzle unit with a fastening element in a schematic illustration.

Furthermore, the nozzle unit 14a has a fastening element 35a. In an installed state, the fastening element 35a is arranged in the fastening recess 34a of the second holding element 28a. The fastening element 35a is formed by a latching bolt. The fastening element 35a has two semi-cylindrical basic bodies which are arranged slightly spaced apart from each other. At the free ends of the basic bodies, a peripheral latching lug is arranged in each case on the lateral surface of the basic bodies. In an installed state of the nozzle unit 14a, the latching lugs of the fastening element 35a are provided for latching behind the fastening recess 34a. The latching lugs latch here behind the fastening recess 34a in such a manner that part of the two semi-cylindrical basic bodies is arranged in the fastening recess 34a and that a remainder of the nozzle unit 14a is arranged on a side of the fastening recess 34a that is opposite the latching lugs. By means of the slight spacing apart of the basic bodies of the fastening element 35a, the basic bodies can be deflected towards each other in a spring-elastic manner during installation, and therefore the latching lugs fit through the fastening recess 34a (FIGS. 1, 5).

The nozzle unit 14a is installable on the wiper arm unit 10a by means of a movement directed in the wiping direction 18a. For installation, the nozzle unit 14a is pushed with a movement directed in the wiping direction 18a against the side flank 16a of the wiper arm unit 10a in such a manner that the first holding element 20a of the wiper arm unit 10a latches in the first recess 36a of the nozzle unit 14a. The nozzle unit 14a is subsequently rotated about an axis, which is formed by the first holding element 20a, perpendicular to the side flank 16a, and therefore the fastening element 35a of the nozzle unit 14a latches in the fastening recess 34a of the wiper arm unit 10a. In a next step, the washer fluid tube (not visible further) can be connected to the connecting branch 56a of the nozzle unit 14a.

FIGS. 6 to 16 show further exemplary embodiments of the invention. The descriptions below are essentially restricted to the differences between the exemplary embodiments, wherein reference can be made with regard to components, features and functions which remain the same to the description of the other exemplary embodiments, in particular FIGS. 1 to 5. In order to differentiate between the exemplary embodiments, the letter a in the reference signs of the exemplary embodiment in FIGS. 1 to 5 is replaced by the letters b to k in the reference signs of the exemplary embodiments of FIGS. 6 to 16. With regard to components which are denoted identically, in particular with regard to components with the same reference signs, reference can basically also be made to the drawings and/or the description of the other exemplary embodiments, in particular FIGS. 1 to 5.

Figure 6:
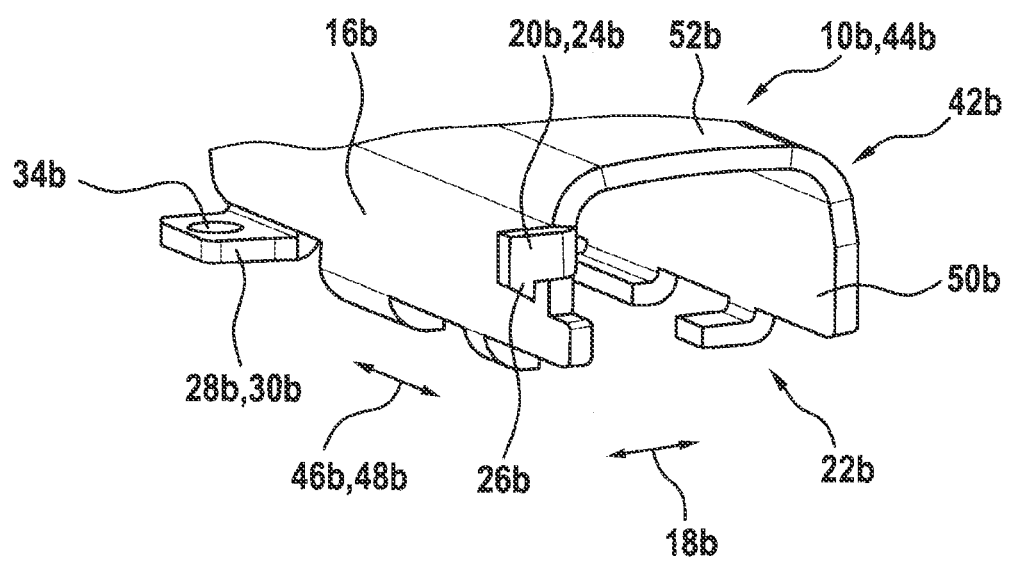
FIG. 6 shows a wiper arm unit of an alternative wiper arm device with a first holding element and with a second holding element in a schematic illustration.

FIG. 6 shows a wiper arm unit 10b of an alternative wiper arm device with a substantially rigid first holding element 20b and with a substantially rigid second holding element 28b.

A nozzle unit, in the installed state, is secured on the first holding element 20b. The first holding element 20b is formed by a first tab 24b pointing in a wiping direction 18b. The first holding element 20b has a barb 26b for securing the nozzle unit. The barb 26b is formed by a lug which protrudes from a basic body of the first holding element 20b. The barb 26b protrudes from the basic body of the first holding element 20b perpendicularly to the main direction of extent 48b of the wiper arm adapter 44b and parallel to a main plane of extent of the side flank 16b.

Furthermore, the nozzle unit, in an installed state, is fastened to the wiper arm unit 10b by means of a latching connection. The nozzle unit has a first recess for receiving the first holding element 20a of the wiper arm unit 10a. In an installed state of the nozzle unit, the first holding element 20b is accommodated in the first recess of the nozzle unit. The nozzle unit has a first spring element which, in the installed state, latches to the first holding element 20a. The first spring element is arranged in the recess of the nozzle unit. The spring element is formed by a spring-elastic web protruding into the recess. The spring element tapers the recess in a direction pointing into the recess. In an installed state of the nozzle unit, the barb 26b of the first holding element 20b latches in the recess behind the first spring element.

Figure 7:
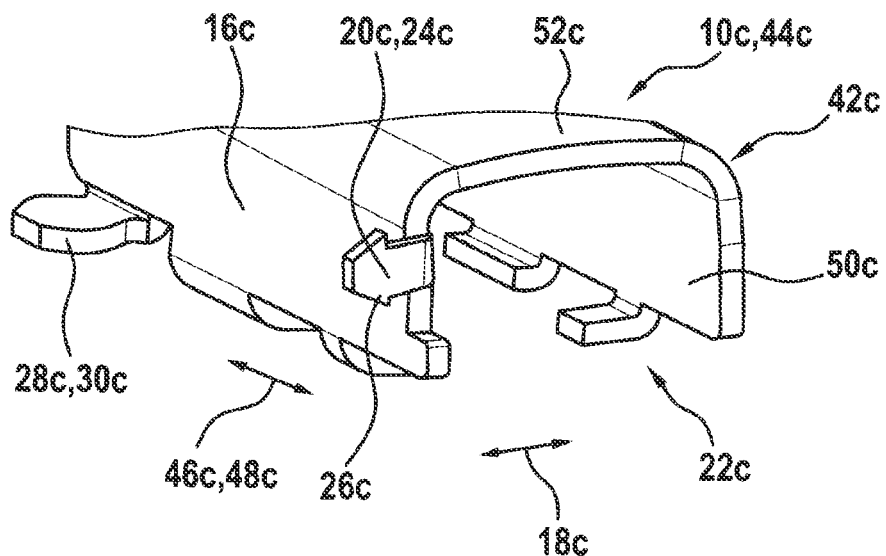
FIG. 7 shows a wiper arm unit of a further alternative wiper arm device with a first holding element and with a second holding element in a schematic illustration.

FIG. 7 shows a wiper arm unit 10c of a further alternative wiper arm device with a substantially rigid first holding element 20c and with a substantially rigid second holding element 28c.

A nozzle unit 14c, in the installed state, is secured on the first holding element 20c. The first holding element 20c is formed by a first tab 24c pointing in a wiping direction 18c. The first holding element 20c has two barbs 26c for securing the nozzle unit 14c. The barbs 26c are in each case formed by lugs which in each case protrude on opposite sides from a basic body of the first holding element 20c. The barbs 26c protrude in each case from the basic body of the first holding element 20c perpendicularly to the main direction of extent 48c of the wiper arm adapter 44c and parallel to a main plane of extent of the side flank 16c. The basic body of the first holding element 20c has a cross section remaining the same.

Figure 8:
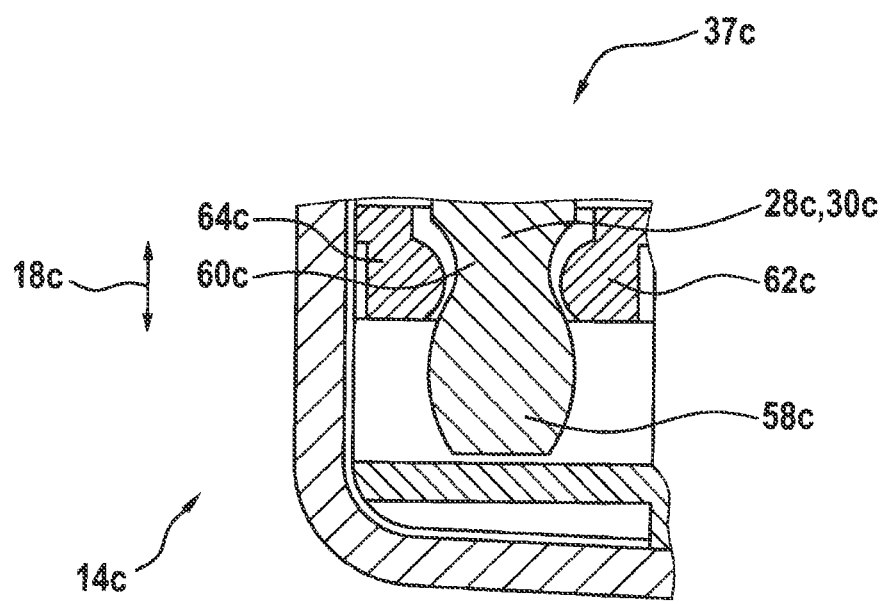
FIG. 8 shows a partial exert of the further alternative wiper arm device comprising a nozzle unit and the wiper arm unit in a schematic sectional illustration through the second holding element of the wiper arm unit.

The nozzle unit 14c, in the installed state, is secured on the first holding element 20c and the second holding element 28c. The second holding element 28c is formed by a second tab 30c pointing in a wiping direction 18c. The second holding element 28c has a length of between 0.5 cm and 1.5 cm, as viewed along the wiping direction 18c. The second holding element 28c has a length of approximately 1 cm, as viewed along the wiping direction 18c. In principle, however, a different length appearing expedient to a person skilled in the art would also be conceivable. The second holding element 28c has a bulbous partial region 58c and a narrowed partial region 60c. The partial regions 58c, 60c are provided for securing the nozzle unit 14c. The bulbous partial region 58c is arranged at a free end of the second holding element 28c. The narrowed partial region 60c is arranged at a fixed end of the second holding element 28c. The narrowed partial region 60c merges directly into the bulbous partial region 58c. Secure latching can be made possible by means of the narrowed partial region 60c (FIG. 8).

In an installed state, the nozzle unit 14c is fastened to the wiper arm unit 10c by means of a latching connection. The nozzle unit 14c has a first recess for receiving the first holding element 20c of the wiper arm unit 10c. Furthermore, the nozzle unit 14c has a second recess 37c for receiving the second holding element 28c. In an installed state of the nozzle unit 14c, the second holding element 28c is accommodated in the second recess 37c of the nozzle unit 14c. The nozzle unit 14c has two second spring elements 62c, 64c which, in the installed state, latch to the second holding element 28c. In an installed state of the nozzle unit 14c, the second holding element 28c latches between the two second spring elements 62c, 64c. The two second spring elements 62c, 64c are arranged in the second recess 37c of the nozzle unit 14c. The two second spring elements 62c, 64c are in each case formed by spring-elastic webs which protrude into the recess 37c and have bulbous projections. The two second spring elements 62c, 64c partially taper the recess 37c. The bulbous projections of the two second spring elements 62c, 64c face each other and protrude into a center of the recess 37c. The bulbous projections of the two second spring elements 62c, 64c are provided for latching in the narrowed partial region 60c of the second holding element 28c. For this purpose, when the nozzle unit 14c is installed, the spring elements 62c, 64c are deflected outwards in a spring-elastic manner by the bulbous partial region 58c and subsequently latch in the narrowed partial region 60c of the second holding element 28c (FIG. 8).

The nozzle unit 14c is installable on the wiper arm unit 10c by means of a movement directed in the wiping direction 18c. For installation, the nozzle unit 14c is pushed with a movement directed in the wiping direction 18c against the side flank 16c of the wiper arm unit 10c in such a manner that the first holding element 20c of the wiper arm unit 10c latches in the first recess 36c of the nozzle unit 14c and the second holding element 28c of the wiper arm unit 10c latches in the second recess 37c of the nozzle unit 14c.

Figure 9:
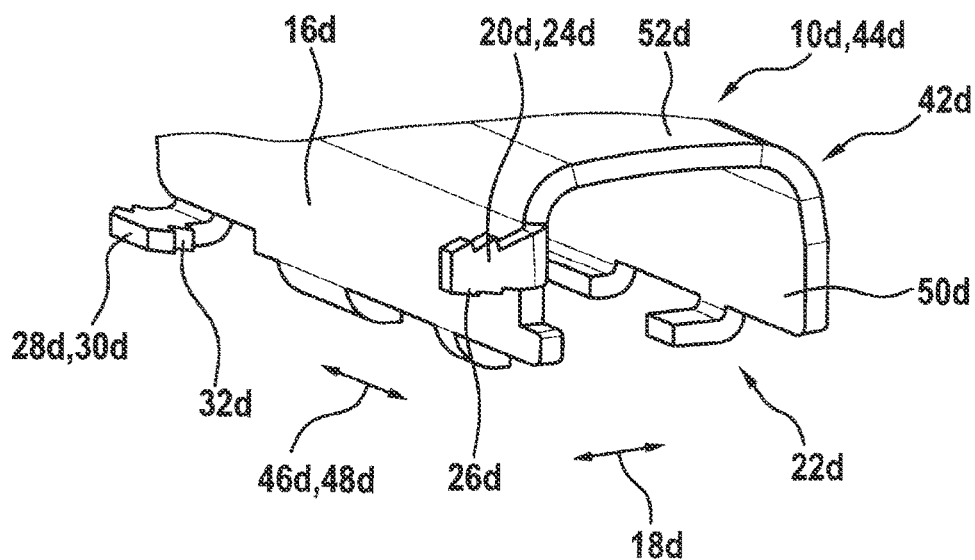
FIG. 9 shows a wiper arm unit comprising a further alternative wiper arm device with a first holding element and with a second holding element in a schematic illustration.

FIG. 9 shows a wiper arm unit 10d of a further alternative wiper arm device with a substantially rigid first holding element 20d and with a substantially rigid second holding element 28d.

A nozzle unit, in the installed state, is secured on the first holding element 20d. The first holding element 20d is formed by a first tab 24d pointing in a wiping direction 18d. The first holding element 20d has four barbs 26d for securing the nozzle unit. In principle, however, a differing number of barbs 26d would also be conceivable. The barbs 26d are in each case formed by lugs, of which in each case two protrude on opposite sides from a basic body of the first holding element 20d. The barbs 26d in each case protrude from the basic body of the first holding element 20d perpendicularly to the main direction of extent 48d of the wiper arm adapter 44d and parallel to a main plane of extent of the side flank 16d. Two barbs 26d are in each case arranged on each side of the basic body of the first holding element 20d. The two barbs 26d of a side are arranged one behind the other, as viewed perpendicularly to the main plane of extent of the side flank 16d. By means of the plurality of barbs 26d, in particular reliable latching can be ensured, even in different positions.

The nozzle unit, in the installed state, is secured on the first holding element 20d and the second holding element 28d. The second holding element 28d is formed by a second tab 30d pointing in a wiping direction 18d. The second holding element 28d has four barbs 32d for securing the nozzle unit. In principle, however, a differing number of barbs 32d would also be conceivable. The barbs 32d are in each case formed by lugs, of which in each case two protrude on opposite sides from a basic body of the second holding element 28c. The barbs 32c in each case protrude from the basic body of the second holding element 28c parallel to a main direction of extent 48c of a wiper arm adapter 44c and parallel to a main plane of extent of the side flank 16c. Two barbs 32d are in each case arranged on each side of the basic body of the second holding element 28d. The two barbs 32d of a side are arranged one behind the other, as viewed perpendicularly to the main plane of extent of the side flank 16d. By means of the plurality of barbs 32d, in particular, reliable latching can be ensured, even in different positions.

In an installed state, the nozzle unit is fastened to the wiper arm unit 10d by means of a latching connection. The nozzle unit has a second recess for receiving the first holding element 20d of the wiper arm unit 10d. In an installed state of the nozzle unit, the second holding element 28d is accommodated in the second recess of the nozzle unit. The nozzle unit has two second spring elements which, in the installed state, latch to the second holding element. In an installed state of the nozzle unit, the second holding element latches between the two second spring elements. The two second spring elements are arranged in the second recess of the nozzle unit. The two second spring elements are in each case formed by spring-elastic webs protruding into the recess. The second spring elements in the second recess are formed at least approximately identically to the first spring elements in the first recess.

Figure 10:
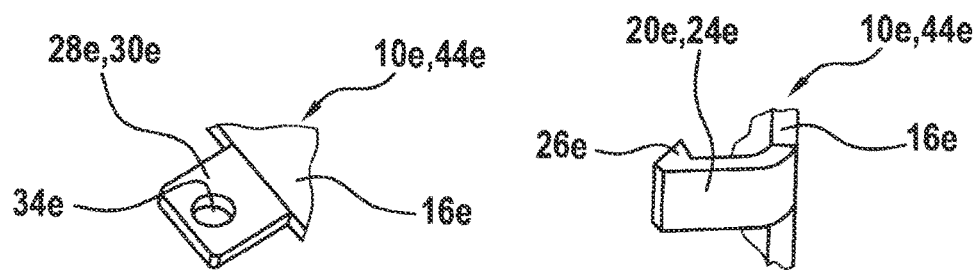
FIG. 10 shows a first holding element and a second holding element of a wiper arm unit of a further alternative wiper arm device in a schematic illustration.

FIG. 10 shows a substantially rigid first holding element 20e and a substantially rigid second holding element 28e of a wiper arm unit 10e of a further alternative wiper arm device.

A nozzle unit, in the installed state, is secured on the first holding element 20e. The first holding element 20e is formed by a first tab 24e pointing in a wiping direction 18e. The first holding element 20e has a barb 26e for securing the nozzle unit 14e. The barb 26e is formed by a lug which protrudes from a basic body of the first holding element 20e. The barb 26e protrudes from the basic body of the first holding element 20e in the direction of a wiper rod of the wiper arm unit 10e parallel to the main direction of extent 48e of the wiper arm adapter 44e and parallel to a main plane of extent of the side flank 16e.

Figure 11:
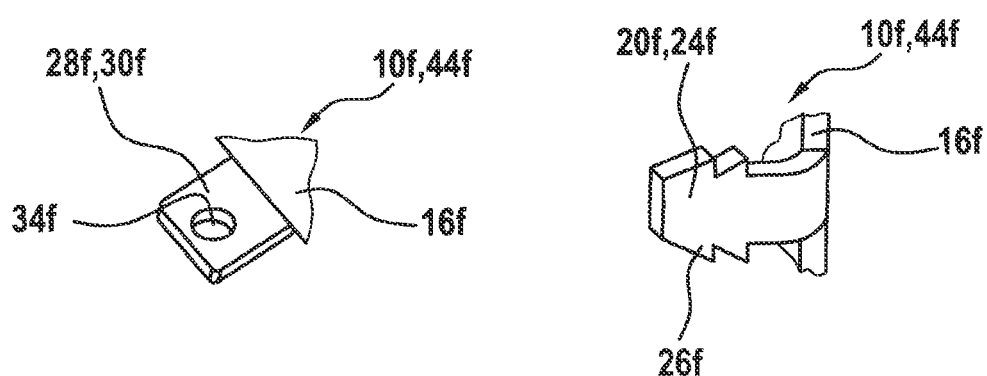
FIG. 11 shows a first holding element and a second holding element of a wiper arm unit of a further alternative wiper arm device in a schematic illustration.

FIG. 11 shows a substantially rigid first holding element 20f and a substantially rigid second holding element 28f of a wiper arm unit 10f of a further alternative wiper arm device.

A nozzle unit, in the installed state, is secured on the first holding element 20f. The first holding element 20f is formed by a first tab 24f pointing in a wiping direction 18f. The first holding element 20f has four barbs 26f for securing the nozzle unit. In principle, however, a differing number of barbs 26f would also be conceivable. The barbs 26f are in each case formed by lugs, of which in each case two protrude on opposite sides from a basic body of the first holding element 20f. The barbs 26f in each case protrude from the basic body of the first holding element 20f perpendicularly to the main direction of extent 48f of the wiper arm adapter 44f and parallel to a main plane of extent of the side flank 16f. In each case two barbs 26f are arranged on each side of the basic body of the first holding element 20f. The two barbs 26f of a side are arranged one behind the other, as viewed perpendicularly to the main plane of extent of the side flank 16f. By means of the plurality of barbs 26f, in particular, reliable latching can be ensured, even in different positions.

Figure 12:
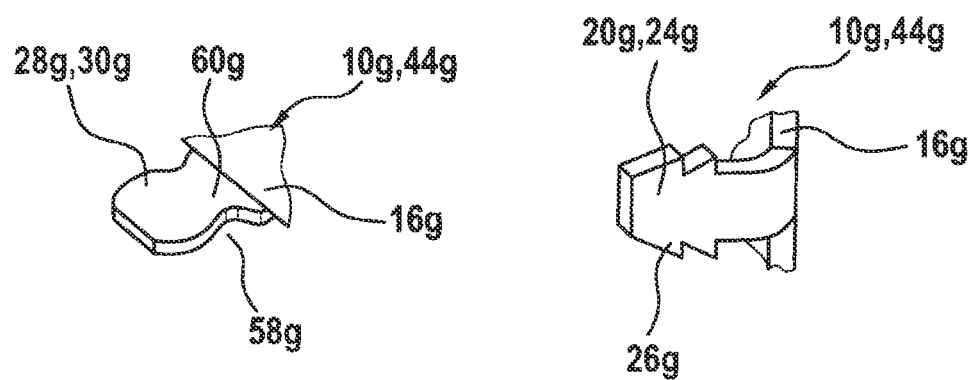
FIG. 12 shows a first holding element and a second holding element of a wiper arm unit of a further alternative wiper arm device in a schematic illustration.

FIG. 12 shows a substantially rigid first holding element 20g and a substantially rigid second holding element 28g of a wiper arm unit 10g of a further alternative wiper arm device.

A nozzle unit, in the installed state, is secured on the first holding element 20g. The first holding element 20g is formed by a first tab 24g pointing in a wiping direction 18g. The first holding element 20g has four barbs 26g for securing the nozzle unit. In principle, however, a differing number of barbs 26g would also be conceivable. The barbs 26g are in each case formed by lugs, of which in each case two protrude on opposite sides from a basic body of the first holding element 20g. The barbs 26g in each case protrude from the basic body of the first holding element 20g perpendicularly to the main direction of extent 48g of the wiper arm adapter 44g and parallel to a main plane of extent of the side flank 16g. Two barbs 26g are in each case arranged on each side of the basic body of the first holding element 20g. The two barbs 26g of a side are arranged one behind the other, as viewed perpendicularly to the main plane of extent of the side flank 16g. By means of the plurality of barbs 26g, in particular, reliable latching can be ensured, even in different positions.

The nozzle unit 14g, in the installed state, is secured on the first holding element 20g and the second holding element 28g. The second holding element 28g is formed by a second tab 30g pointing in a wiping direction 18g. The second holding element 28g has a bulbous partial region 58g and a narrowed partial region 60g. The partial regions 58g, 60g are provided for securing the nozzle unit 14g. The bulbous partial region 58g is arranged at a free end of the second holding element 28g. The narrowed partial region 60g is arranged at a fixed end of the second holding element 28g. The narrowed partial region 60g merges directly into the bulbous partial region 58g. Reliable latching can be made possible by means of the narrowed partial region 60g.

Figure 13:
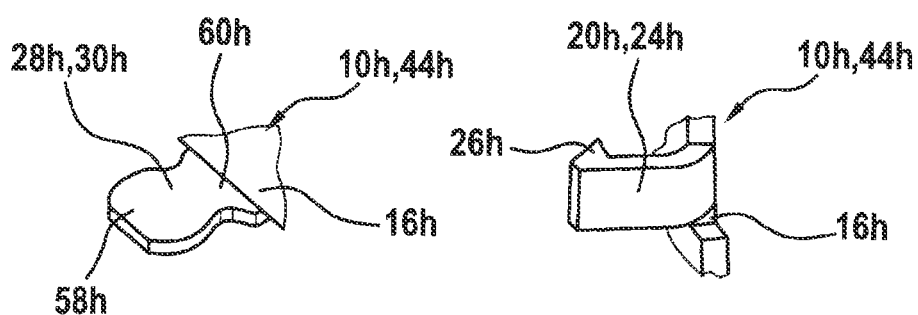
FIG. 13 shows a first holding element and a second holding element of a wiper arm unit of a further alternative wiper arm device in a schematic illustration.

FIG. 13 shows a substantially rigid first holding element 20h and a substantially rigid second holding element 28h of a wiper arm unit 10h of a further alternative wiper arm device.

A nozzle unit, in the installed state, is secured on the first holding element 20h. The first holding element 20h is formed by a first tab 24h pointing in a wiping direction 18h. The first holding element 20h has a barb 26h for securing the nozzle unit. The barb 26h is formed by a lug which protrudes from a basic body of the first holding element 20h. The barb 26h protrudes from the basic body of the first holding element 20h in the direction of a wiper rod of the wiper arm unit 10h parallel to the main direction of extent 48h of the wiper arm adapter 44h and parallel to a main plane of extent of the side flank 16h.

The nozzle unit 14h, in the installed state, is secured on the first holding element 20h and the second holding element 28h. The second holding element 28h is formed by a second tab 30h pointing in a wiping direction 18h. The second holding element 28h has a bulbous partial region 58h and a narrowed partial region 60h. The partial regions 58h, 60h are provided for securing the nozzle unit 14h. The bulbous partial region 58h is arranged at a free end of the second holding element 28h. The narrowed partial region 60h is arranged at a fixed end of the second holding element 28h. The narrowed partial region 60h merges directly into the bulbous partial region 58h. Secure latching can be made possible by the narrowed partial region 60h.

Figure 14:
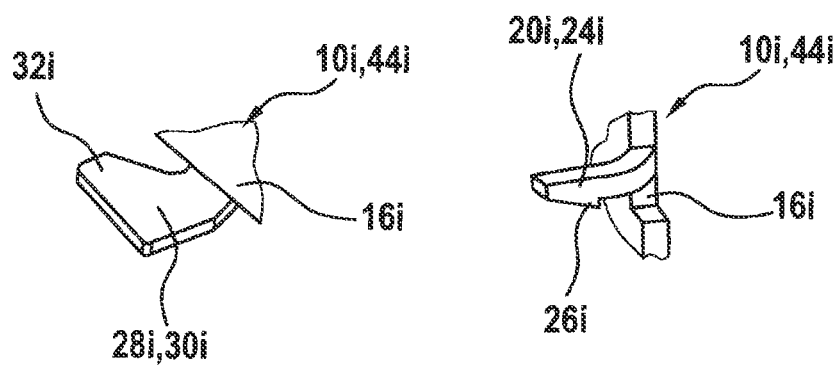
FIG. 14 shows a first holding element and a second holding element of a wiper arm unit of a further alternative wiper arm device in a schematic illustration.

FIG. 14 shows a substantially rigid first holding element 20i and a substantially rigid second holding element 28i of a wiper arm unit 10i of a further alternative wiper arm device.

A nozzle unit 14i, in the installed state, is secured on the first holding element 20i. The first holding element 20i is formed by a first tab 24i pointing in a wiping direction 18i. The first holding element 20i has a barb 26i for securing the nozzle unit 14i. The barb 26i is formed by a lug which protrudes from a basic body of the first holding element 20i. The barb 26i protrudes from the basic body of the first holding element 20i perpendicularly to the main direction of extent 48i of the wiper arm adapter 44i and parallel to a main plane of extent of the side flank 16i.

The nozzle unit 14i, in the installed state, is secured on the first holding element 20i and the second holding element 28i. The second holding element 28i is formed by a second tab 30i pointing in a wiping direction 18i. The second holding element 28i has a length of between 0.5 cm and 1.5 cm, as viewed along the wiping direction 18i. The second holding element 28i has a length of approximately 0.8 cm, as viewed along the wiping direction 18i. In principle, however, a different length appearing expedient to a person skilled in the art would also be conceivable. The second holding element 28i has a barb 32i for securing the nozzle unit 14i. The barb 32i is formed by a web which runs transversely with respect to a basic body of the second holding element 28i and protrudes from the basic body of the second holding element 28i. The barb 32i protrudes from the basic body of the second holding element 28i in the direction of a wiper rod of the wiper arm unit 10i parallel to the main direction of extent 48i of the wiper arm adapter 44i and parallel to a main plane of extent of the side flank 16i.

Figure 15:
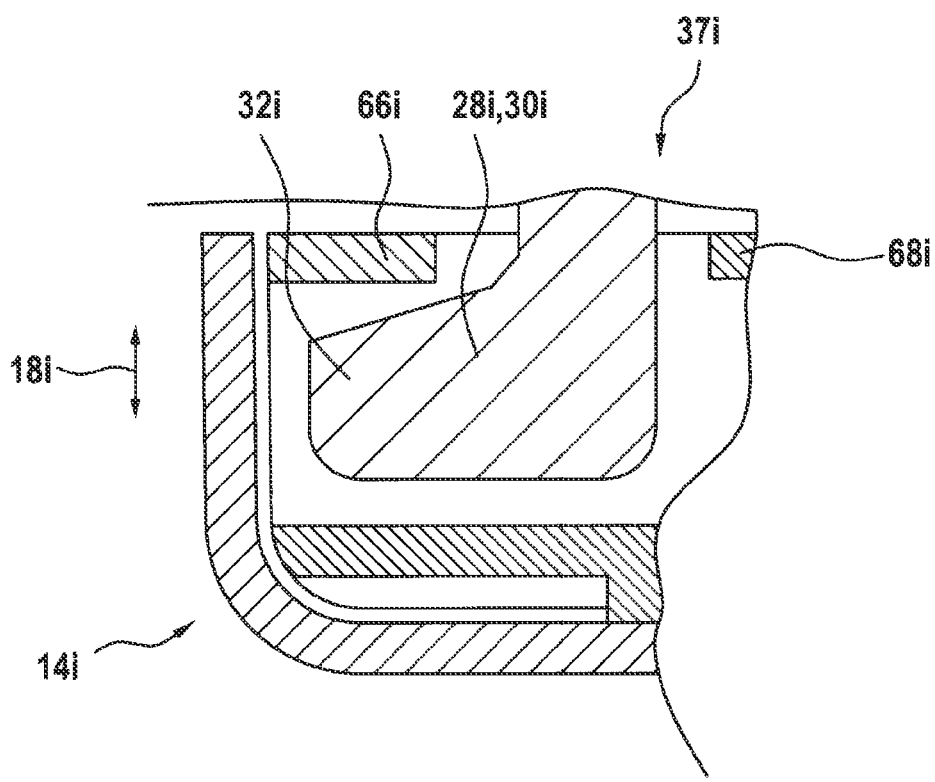
FIG. 15 shows a partial exert of the further alternative wiper arm device comprising a nozzle unit and the second holding element of the wiper arm unit in a schematic sectional illustration through the second holding element.

The nozzle unit 14i is fastened, in an installed state, to the wiper arm unit 10i by means of a latching connection. The nozzle unit 14i has a first recess for receiving the first holding element 20i of the wiper arm unit 10i. Furthermore, the nozzle unit 14i has a second recess 37i for receiving the second holding element 28i. In an installed state of the nozzle unit 14i, the second holding element 28i is accommodated in the second recess 37i of the nozzle unit 14i. The nozzle unit 14i has two walls 66i, 68i which are provided for partially covering the second recess 37i. The two walls 66i, 68i are at a distance from each other and therefore form an opening of the second recess 37i. The opening of the second recess 37i is wider than a width of the basic body of the second holding element 28i and narrower than a width of the entire second holding element 28i with the barb 32i. The second holding element 28i can thus be brought into the recess 37i by means of a tilting movement. In the recess 37i, the barb 32i is then secured by the wall 66i against being pulled out. The nozzle unit 14i can thus be secured against being pulled away vertically. The effect in particular that can be achieved by this is that the nozzle unit 14i can be released only by a combination of movements, and therefore an unintentional release can be prevented (FIG. 15).

The nozzle unit 14i is partially installable on the wiper arm unit 10i by means of a movement directed in the wiping direction 18i. For installation, the second holding element 28i is brought beforehand into the recess 37i by a tilting movement of the nozzle unit 14i. The nozzle unit 14i is subsequently pushed with a movement directed in the wiping direction 18i against the side flank 16i of the wiper arm unit 10i in such a manner that the first holding element 20i of the wiper arm unit 10i latches in the first recess of the nozzle unit 14i.

Figure 16:
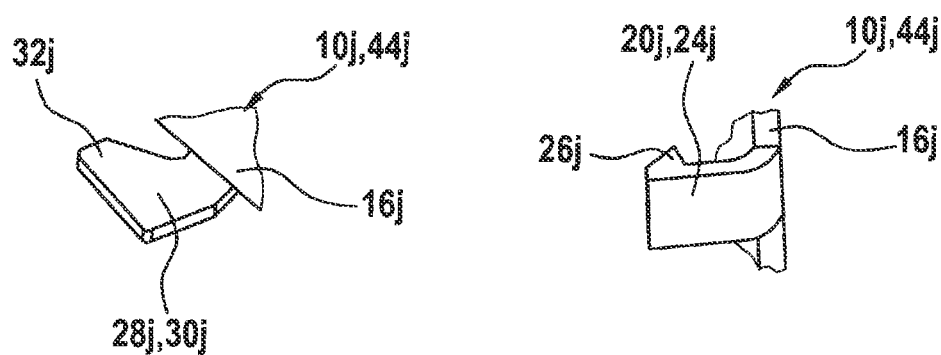
FIG. 16 shows a first holding element and a second holding element of a wiper arm unit of a further alternative wiper arm device in a schematic illustration.

FIG. 16 shows a substantially rigid first holding element 20j and a substantially rigid second holding element 28j of a wiper arm unit 10j of a further alternative wiper arm device.

A nozzle unit, in the installed state, is secured on the first holding element 20j. The first holding element 20j is formed by a first tab 24j pointing in a wiping direction 18j. The first holding element 20j has a barb 26j for securing the nozzle unit. The barb 26j is formed by a lug which protrudes from a basic body of the first holding element 20j. The barb 26j protrudes from the basic body of the first holding element 20j in the direction of a wiper rod of the wiper arm unit 10j parallel to the main direction of extent 48j of the wiper arm adapter 44j and parallel to a main plane of extent of the side flank 16j.

The nozzle unit 14j, in the installed state, is secured on the first holding element 20j and the second holding element 28j. The second holding element 28j is formed by a second tab 30j pointing in a wiping direction 18j. The second holding element 28j has a barb 32j for securing the nozzle unit. The barb 32j is formed by a web which runs transversely with respect to a basic body of the second holding element 28j and protrudes from the basic body of the second holding element 28j. The barb 32j protrudes from the basic body of the second holding element 28j in the direction of a wiper rod of the wiper arm unit 10j parallel to the main direction of extent 48j of the wiper arm adapter 44j and parallel to a main plane of extent of the side flank 16j.

Figure 17:
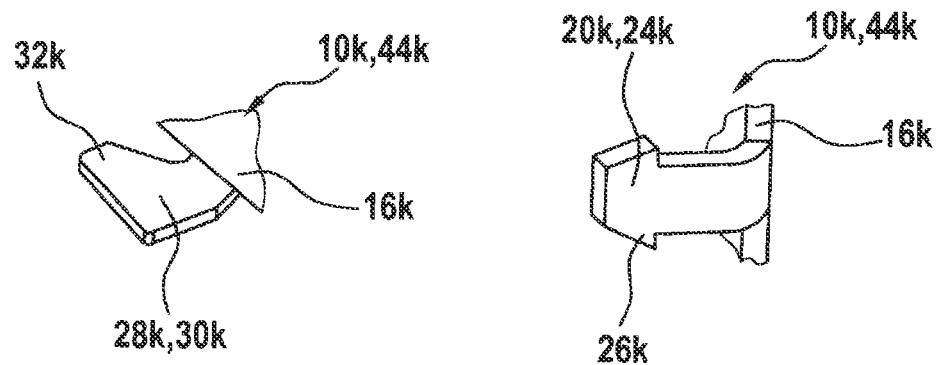
FIG. 17 shows a first holding element and a second holding element of a wiper arm unit of a further alternative wiper arm device in a schematic illustration.

FIG. 17 shows a substantially rigid first holding element 20k and a substantially rigid second holding element 28k of a wiper arm unit 10k of a further alternative wiper arm device.

A nozzle unit, in the installed state, is secured on the first holding element 20k. The first holding element 20k is formed by a first tab 24k pointing in a wiping direction 18k. The first holding element 20k has two barbs 26k for securing the nozzle unit. The barbs 26k are in each case formed by lugs which protrude in each case on opposite sides from a basic body of the first holding element 20k. The barbs 26k in each case protrude from the basic body of the first holding element 20k perpendicularly to the main direction of extent 48k of the wiper arm adapter 44k and parallel to a main plane of extent of the side flank 16k.

The nozzle unit, in the installed state, is secured on the first holding element 20k and the second holding element 28k. The second holding element 28k is formed by a second tab 30k pointing in a wiping direction 18k. The second holding element 28k has a barb 32k for securing the nozzle unit 14k. The barb 32k is formed by a web which runs transversely with respect to a basic body of the second holding element 28k and protrudes from the basic body of the second holding element 28k. The barb 32k protrudes from the basic body of the second holding element 28k in the direction of a wiper rod of the wiper arm unit 10k parallel to the main direction of extent 48k of the wiper arm adapter 44k and parallel to a main plane of extent of the side flank 16k.

The combinations, illustrated in the figures, of the first holding elements 20a; 20b; 20c; 20d; 20e; 20f; 20g; 20h; 20i; 20j; 20k with the second holding elements 28a; 28b; 28c; 28d; 28e; 28f; 28g; 28h; 28i; 28j; 28k should be understood here as being merely by way of example. In principle, any other combinations are also conceivable. The configurations of the first holding elements 20a; 20b; 20c; 20d; 20e; 20f; 20g; 20h; 20i; 20j; 20k are not restricted here to the first holding element and the configurations of the second holding elements 28a; 28b; 28c; 28d; 28e; 28f; 28g; 28h; 28i; 28j; 28k are not restricted to the second holding element. The nozzle units 14a; 14c; 14i, in particular the recesses 36a; 37c; 37i and fastening elements 35a, are in each case preferably matched here to the holding elements 20a; 20b; 20c; 20d; 20e; 20f; 20g; 20h; 20i; 20j; 20k; 28a; 28b; 28c; 28d; 28e; 28f; 28g; 28h; 28i; 28j; 28k. In principle, however, different recesses and fastening elements appearing expedient to a person skilled in the art would also be conceivable.

What is claimed is:

1. A wiper arm device comprising a wiper arm unit (10a; 10b; 10c; 10d; 10e; 10f; 10g; 10h; 10i; 10j; 10k) which has at least one wiper rod (12a), and at least one nozzle unit (14a; 14c; 14i) which is provided for applying washer fluid onto a vehicle window, and which, in an installed state, is arranged at least substantially laterally on the wiper arm unit (10a; 10b; 10c; 10d; 10e; 10f; 10g; 10h; 10i; 10j; 10k), characterized in that the at least one nozzle unit (14a; 14c; 14i), in an installed state, is arranged at least substantially as an extension of the wiper rod (12a) of the wiper arm unit (10a; 10b; 10c; 10d; 10e; 10f; 10g; 10h; 10i; 10j; 10k) and is fastened to the wiper arm unit (10a; 10b; 10c; 10d; 10e; 10f; 10g; 10h; 10i; 10j; 10k) by a latching connection, wherein the wiper arm unit includes at least one substantially rigid first holding element (20a; 20b; 20c; 20d; 20e; 20f; 20g; 20h; 20i; 20j; 20k) on which the at least one nozzle unit is fixed in the installed state, and at least one substantially rigid second holding element (28a; 28b; 28c; 28d; 28e; 28f; 28g; 28h; 28i; 28j; 28k) on which the at least one nozzle unit is fixed in the installed state, wherein the at least one second holding element is longitudinally spaced apart from the at least one first holding element along a main direction of extent (46a; 46b; 46c; 46d; 46e; 46f; 46g; 46h; 46i; 46j; 46k) of the wiper rod (12a), wherein a main plane of extent of the at least one first holding element and a main plane of extent of the at least one second holding element enclose an angle of approximately 90°, wherein the at least one nozzle unit (14a, 14c, 14i) has at least two first spring elements (38a, 40a) which are deflected by the at least one first holding element, and between which the at least one first holding element (20a, 20b, 20c, 20d, 20e, 20f, 20g, 20h, 20i, 20j, 20k) is latched in the installed state.

2. The wiper arm device according to claim 1, characterized in that the at least one nozzle unit (14a; 14c; 14i), in the installed state, is arranged at least substantially outside a side flank (16a; 16b; 16c; 16d; 16e; 16f; 16g; 16h; 16i; 16j; 16k) of the wiper arm unit (10a; 10b; 10c; 10d; 10e; 10f; 10g; 10h; 10i; 10j; 10k).

3. The wiper arm device according to claim 1, characterized in that the at least one nozzle unit (14a; 14c; 14i) is configured to be installed on the wiper arm unit (10a; 10b; 10c; 10d; 10e; 10f; 10g; 10h; 10i; 10j; 10k) at least by a movement directed in a wiping direction (18a; 18b; 18c; 18d; 18i).

4. The wiper arm device according to claim 1, characterized in that the at least one first holding element (20a; 20b; 20c; 20d; 20e; 20f; 20g; 20h; 20i; 20j; 20k) is arranged on an end side (22a; 22b; 22c; 22d) of the wiper arm unit (10a; 10b; 10c; 10d; 10e; 10f; 10g; 10h; 10i; 10j; 10k).

5. The wiper arm device at least according to claim 1, characterized in that the at least one first holding element (20a; 20b; 20c; 20d; 20e; 20f; 20g; 20h; 20i; 20j; 20k) is formed by a first tab (24a; 24b; 24c; 24d; 24e; 24f; 24g; 24h; 24i; 24j; 24k) pointing in a wiping direction (18a; 18b; 18c; 18d; 18i).

6. The wiper arm device at least according to claim 5, characterized in that the at least one second holding element (28a; 28b; 28c; 28d; 28e; 28f; 28g; 28h; 28i; 28j; 28k) is formed by a second tab (30a; 30b; 30c; 30d; 30e; 30f; 30g; 30h; 30i; 30j; 30k) pointing in a wiping direction (18a; 18b; 18c; 18d; 18i).

7. The wiper arm device at least according to claim 1, characterized in that the at least one first holding element (20a; 20b; 20c; 20d; 20e; 20f; 20g; 20h; 20i; 20j; 20k) has at least one barb (26a; 26b; 26c; 26d; 26e; 26f; 26g; 26h; 26i; 26j; 26k) for securing the at least one nozzle unit (14a; 14c; 14i).

8. The wiper arm device according to claim 1, characterized in that the at least one second holding element (28a; 28b; 28c; 28d; 28e; 28f; 28g; 28h; 28i; 28j; 28k) is arranged spaced apart from an end side (22a; 22b; 22c; 22d) of the wiper arm unit (10a; 10b; 10c; 10d; 10e; 10f; 10g; 10h; 10i; 10j; 10k).

9. The wiper arm device at least according to claim 1, characterized in that the at least one second holding element (28d; 28i; 28j; 28k) has at least one barb (32d; 32i; 32j; 32k) for securing the at least one nozzle unit (14i).

10. The wiper arm device at least according to claim 1, characterized in that the at least one second holding element (28a; 28b; 28e; 28f) has at least one fastening recess (34a; 34b; 34e; 34f) for receiving at least one fastening element (35a) for securing the at least one nozzle unit (14a).

11. The wiper arm device at least according to claim 10, characterized in that the at least one nozzle unit (14a) has a fastening element (35a) which, in the installed state, is arranged in the at least one fastening recess (34a; 34b; 34e; 34f).

12. The wiper arm device at least according to claim 1, characterized in that the at least one nozzle unit (14a; 14c;

14*i*) has at least one first recess (36*a*) for receiving the at least one first holding element (20*a*; 20*b*; 20*c*; 20*d*; 20*e*; 20*f*; 20*g*; 20*h*; 20*i*; 20*j*; 20*k*).

13. The wiper arm device at least according to claim 12, characterized in that the at least one nozzle unit (14*c*; 14*i*) has at least one second recess (37*c*; 37*i*) for receiving the at least one second holding element (28*c*; 28*d*; 28*g*; 28*h*; 28*i*; 28*j*; 28*k*).

14. The wiper arm device at least according to claim 12, characterized in that the at least one nozzle unit (14*a*; 14*c*; 14*i*) has at least one first spring element (38*a*, 40*a*) which, in the installed state, is deflected by and is latched to the at least one first holding element (20*a*; 20*b*; 20*c*; 20*d*; 20*e*; 20*f*; 20*g*; 20*h*; 20*i*; 20*j*; 20*k*).

15. A wiper arm comprising at least one wiper arm device according to claim 1.

16. The wiper arm device at least according to claim 1, wherein the at least one nozzle unit has at least two second spring elements (62*c*, 64*c*) which are deflected by the at least one second holding element, and between which the at least one second holding element is latched in the installed state.

17. The wiper arm device at least according to claim 1, wherein the at least one first holding element and the at least one second holding element both extend laterally along a wiping direction (18*a*; 18*b*; 18*c*; 18*d*) such that the at least one nozzle unit is arranged laterally relative to the wiper arm unit along the wiping direction in the installed state, the wiping direction being a direction in which, during an operating state, the wiper arm unit is guided over a vehicle window, the wiping direction being perpendicular to the main direction of extent of the wiper rod.

18. The wiper arm device at least according to claim 1, wherein the at least one first holding element and the at least one second holding element are arranged such that the at least one nozzle unit must be moved both along a translational and rotation direction to couple the at least one nozzle unit to the wiper arm unit.

* * * * *